March 13, 1956  R. E. GEARHART ET AL  2,737,988
SCREW HOLDING ATTACHMENT FOR SCREWDRIVERS
Filed March 26, 1952  2 Sheets-Sheet 1
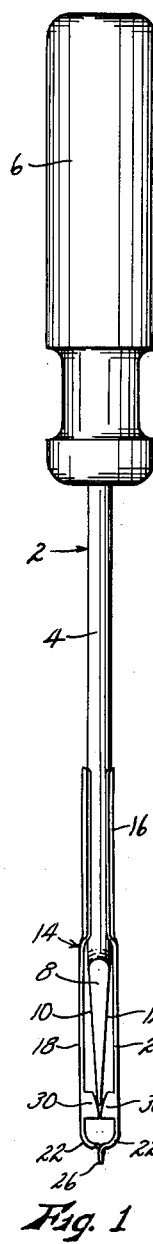
Fig. 1
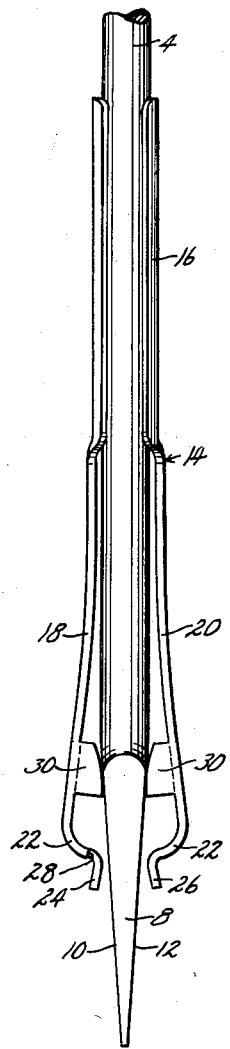
Fig. 2
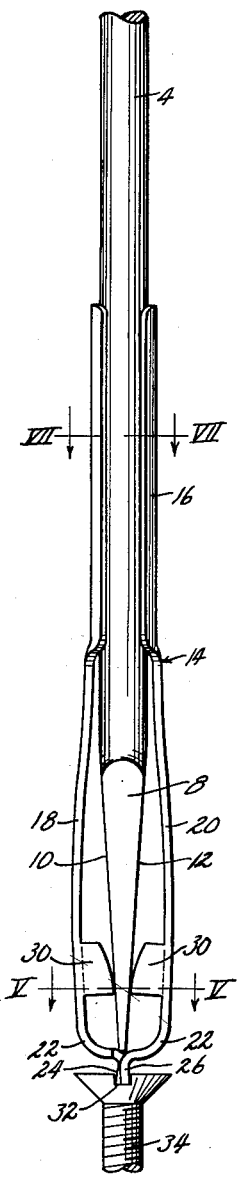
Fig. 3
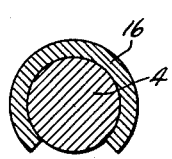
Fig. 7
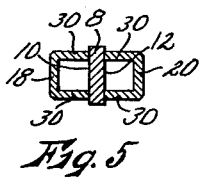
Fig. 4 / Fig. 5
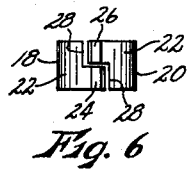
Fig. 6
INVENTOR.
Roy E. Gearhart
Robert F. Dickens
BY Hamilton & Hamilton
Attorneys.

March 13, 1956 R. E. GEARHART ET AL 2,737,988
SCREW HOLDING ATTACHMENT FOR SCREWDRIVERS
Filed March 26, 1952 2 Sheets-Sheet 2

INVENTOR.
Roy E. Gearhart
BY Robert F. Dickens
Hamilton & Hamilton
Attorneys.

United States Patent Office 2,737,988
Patented Mar. 13, 1956

2,737,988

SCREW HOLDING ATTACHMENT FOR SCREWDRIVERS

Roy E. Gearhart, Kansas City, Mo., and Robert F. Dickens, Overland Park, Kans.

Application March 26, 1952, Serial No. 278,702

4 Claims. (Cl. 145—50)

This invention relates to new and useful improvements in screw holders, and has particular reference to a screw holding device adapted to serve as an attachment for an ordinary screw driver.

Various types of screw holding devices have been made which involve generally a split or divided bit adapted to be inserted in the screw driver slot of a screw, and having some means for spreading the parts of said bit to engage the sides of said screw driver slot to hold the screw firmly as it is started in or removed from the object in which it is threaded. Said bit is customarily mounted at the end of a long shank, for providing access to screws which cannot be conveniently reached by hand. Also, various attempts have been made to strengthen screw holders of this type so that they can deliver the considerable torque necessary to set a screw tightly, or to loosen a screw which has been previously set. So far as is known, these attempts have been largely unsuccessful, due to the fact that splitting or dividing the tip of the bit renders said bit relatively fragile, and entirely too weak to deliver the necessary torque. Consequently, the usual result has been that two tools are necessary, a screw holder for starting the screw, and a screw driver for setting it tightly. This is obviously inconvenient, and expensive.

The principal object of this invention is, therefore, the provision of a screw holding device which may be quickly and easily attached to any ordinary screw driver, and which is operable by its relationship to said screw driver to hold a screw, and which at the same time will not interfere with the use of the screw driver in performing its usual functions.

Another object is the provision of a screw holding attachment which may be used in connection with the standard screw driver having a wedge-shaped bit, or with a screw driver having a bit which is cruciform in cross-section, the latter being commonly known as a "Phillips" screw driver, and wherein the bit of the screw holding attachment itself is adapted, with or without modification, to engage the cruciform slot of a "Phillips" screw.

A further object is the provision of a screw holding device of the character described having a bit specially adapted to hold screws having worn screw driver slots.

Other objects are simplicity and economy of structure, dependability and efficiency of operation, adaptability for use with many types and sizes of screwdrivers and with screws having screwdriver slots of varying widths, and adaptability to deliver a considerable turning torque to the screw held thereby.

With these objects in view, as well as other objects which will appear in the course of the specification, reference will be had to the drawing, wherein:

Fig. 1 is a side elevational view of a screw driver of ordinary design, showing a screw holding attachment embodying the present invention mounted in operative position thereon.

Fig. 2 is an enlarged fragmentary view similar to Fig. 1, showing the screw holding attachment retracted to its inoperative position.

Fig. 3 is a view similar to Fig. 2, but showing the screw holder in operative engagement with a screw.

Fig. 4 is a fragmentary view taken at right angles to the line of sight in Fig. 3, with parts broken away.

Fig. 5 is a sectional view taken on line V—V of Fig. 3.

Fig. 6 is a lower end view of the screw holding device as shown in Fig. 1, with parts omitted.

Fig. 7 is an enlarged sectional view taken on line VII—VII of Fig. 3.

Figure 8:
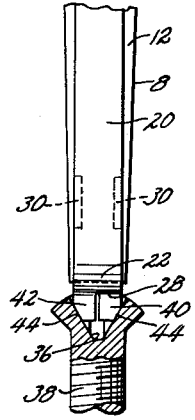
Fig. 8 is a view similar to Fig. 4, showing a modification of the shape of the screw holding bits.

Like reference numerals apply to similar parts throughout the several views, and the numeral 2 refers to a screw driver of ordinary design including a rod-like shank 4 to one end of which is rigidly attached a handle 6, and the opposite end of which is formed to present a wedge-shaped bit 8, the relatively inclined faces 10 and 12 of which converge toward the free end thereof.

The screw holding attachment forming the subject of this invention is designated generally by the numeral 14, and is preferably formed of a single unitary piece of flat spring stock, cut and formed as shown. At its upper end it is formed to present a generally tubular clip 16 open longitudinally along one edge to form a C-shaped cross-section, as shown in Fig. 7, whereupon said clip may be snapped over the shank 4 of the screw driver. Said clip is thereby mounted for frictional sliding movement along said shank. Extending longitudinally from said clip are a pair of flat resilient arms 18 and 20 disposed respectively on diametrically opposite sides of shank 4. As shown in Fig. 1, said arms normally extend beyond the end of bit 8, and are curved inwardly toward each other at their free ends as indicated at 22, and are then rebent so that their extreme end portions extend substantially longitudinally of the device to form bits 24 and 26 respectively. As best shown in Fig. 6, the end portions of arms 18 and 20 are oppositely notched as at 28 so that bits 24 and 26 each have a width equal to substantially half the width of said arms, and so that said bits may move substantially into a common plane coinciding with the central plane of screw driver bit 8. Thus said bits, in conjunction, form a single split bit parallel to and substantially coextensive with bit 8. As best shown in Fig. 3, bits 24 and 26 are inclined downwardly and slightly outwardly in opposite directions, for a purpose which will be more fully described hereinafter.

Carried by each of arms 18 and 20 adjacent the free end thereof are a pair of ears 30, disposed respectively at the opposite lateral edges of said arm and being turned inwardly to bear slidably at their inner ends against the adjacent wedge face 10 or 12 of screw driver bit 8. These ears thus serve as fulcrums in the operation of the screw holding bits 24 and 26, as will be more fully described. The bit contacting edge surfaces of ears 30 are arcuately curved, as shown.

The operation of the device as shown in Figs. 1 to 7 is substantially as follows: When it is desired to engage a screw, clip 16 is moved manually along shank 4 until arms 18 and 20 extend beyond the end of screw driver bit, as shown in Fig. 1. The normal or unflexed form of said arms is such as to hold bits 24 and 26 in alignment as shown in Fig. 6. The bits are then inserted in the usual manner in the screw driver slot 32 of a screw 34, and the screw driver is pushed axially through clip 16, thereby introducing the wedge-shaped screw driver bit 8 between the fulcrum members 30 of the respective arms 18 and 20. The wedge faces 10 and 12 of said bit flex arms 18 and 20 outwardly, moving the bits 24 and 26 transversely outwardly in opposite directions to engage the opposite side walls of screw slot 32, thereby holding the screw firmly in position on the bits 24 and 26. The parts then have the relative position shown in Fig. 3. The wedge taper of bit 8 is sufficiently slight that the system is self-locking. That is, fulcrum members 30 will not be moved along the bit 8 by the longitudinal component of their own force thereagainst.

As is plainly seen in Fig. 3, the opposite outward inclinations of bits 24 and 26 provide that they grip the screw principally at the bottom of screw slot 32. This is important in that it tends to provide a secure grip on screws the slots of which have become worn through continued use. The distance to which bits 24 and 26 must be expanded depends of course on the width of the screw slot 32, and is therefore subject to considerable variation. Consequently, bits 24 and 26 may contact the side walls of the slot 32 while the lower edge of bit 8 is still a substantial distance away from contact with arms 18 and 20 at the upper ends of bits 24 and 26. This contacting relationship is shown in Fig. 3, and functions as a means for providing a definite stop for bit 8, and prevents damage to the relatively fragile bits 24 and 26 which might otherwise occur due to excessive transverse loading of said bits if screw driver bit 8 were advanced too far between members 30. If, as described above, bits 24 and 26 are moved into actual gripping contact with the screw slot walls before the end of bit 8 contacts arms 18 and 20, then continued movement of bit 8 will merely cause arms 18 and 20 to bow slightly outwardly as shown in Fig. 3, permitting bit 8 to move on to its stop point without unduly overloading bits 24 and 26. The opposite inclination of bits 24 and 26 is also useful in this connection. The bowing action of arms 18 and 20 as just described would cause the bits to tilt relatively inwardly, with a resultant tendency of the screw to slip off, were said bits not initially inclined outwardly.

Since the screw is then held firmly as in Fig. 3, it may be started in any screw hole which is accessible by use of the full length of shank 4, which may of course be of any desired length. Furthermore, since the screw holding bits are operable by a simple pressure at the rearward end of handle 6, the tool is equally useful in removing screws from inaccessible screw holes.

When it is desired to apply the final torque for setting a screw tightly, or for initially loosening a tightly set screw, clip 16 is simply moved upwardly on screw driver shank 4 until bits 24 and 26 are retracted above the end of bit 8, as shown in Fig. 2. Bit 8 is thus exposed for use in its usual manner, without the necessity of removing the screw holding attachment from the screw driver.

While the present device is not adapted to deliver the heavy torques necessary in setting some screws tightly, and while within applicant's knowledge no "split-bit" screw holder has ever been produced which is practical for this purpose, the present device nevertheless possesses structural features which make the tool exceptionally sturdy and adapted, within inherent limitations, to deliver a maximum torque. For example, the formation of the bit in two longitudinally split sections permits the use of spring stock of a thickness virtually as large as the width of the screw slot, and consequently of greater strength. Furthermore, the positioning of fulcrum members 30 at the extreme lateral edges of arms 18 and 20 provides that screw driver bit 8 can deliver a maximum torque to said arms through said fulcrum members.

It is believed quite apparent that the form of our invention so far described is adapted also for use in the cross-shaped slot of certain screws commonly known as "Phillips" screws, the bits 24 and 26 merely being inserted in one of the arms of said slot and operated in the usual manner. However, as shown in Fig. 8, the screw slot 36 of a Phillips screw 38 is customarily taperingly reduced toward its bottom, and this necessarily limits the insertion of bits 24 and 26 therein. Fig. 8 illustrates a slight modification of the bits which increases their usefulness as applied to Phillips screws. Therein, the screw holding bits 40 and 42, which correspond to bits 24 and 26 of the species shown in Figs. 1 to 7, have their outer or distal corners bevelled as indicated at 44, to a degree corresponding to the taper of screw slot 36. This permits the bits to be inserted into the slot to a greater extent. The operation and structure thereof is otherwise identical with that of Figs. 1 to 7.

Figure 9:
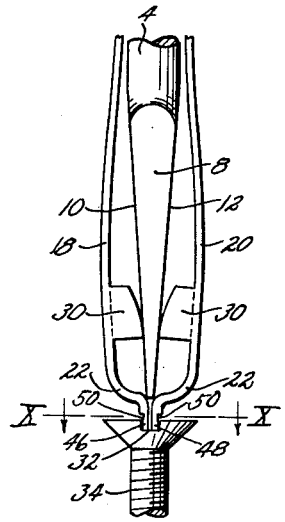
Fig. 9 is a fragmentary view similar to Fig. 3, showing a second modification of the shape of the screw holding bits.
Figure 10:
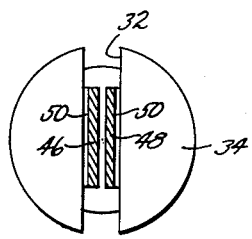
Fig. 10 is an enlarged sectional view taken on line X—X of Fig. 9.

Figs. 9 and 10 illustrate a further modification of the bits as applied to standard screws. Therein the two bits 46 and 48 do not overlap each other or move into coplanar relation. Instead, each has a full width of the corresponding arms 18 and 20, and they normally bear flat against each other except when expanded by bit 8 as shown. The bits must necessarily be somewhat thinner, in order that both may be inserted simultaneously in groove 32 of the screws, and this is provided by notching the outer faces of said bits as indicated at 50. The faces of said notches are inclined downwardly and outwardly, in order that the bits will grip the screw at the base of the screw driver slot as previously described. The structure and operation of this species is otherwise identical with that of Figs. 1 to 7. This species, though somewhat more fragile than that previously described, has the advantage of providing equal torque in either direction.

Figure 13:
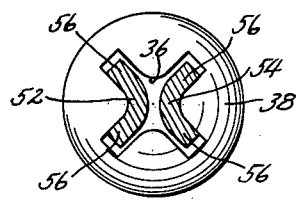
Fig. 13 is an enlarged section taken on line XII—XII of Fig. 12.

Figs. 10 to 14 illustrate a further modification of the bits as applied to Phillips screws. Therein each of bits 52 and 54 is folded longitudinally along its midline so that the lateral edge portions 56 thereof, as best shown in Fig. 13, are inclined substantially at right angles to each other, and are inclined outwardly from the midplane of the device substantially at forty-five degrees. The ends of the bits are tapered, as indicated at 58. The edge portions 56 of each bit are adapted to be inserted in two adjacent arms of the screw slot 36, and to grip the side walls of said slot when the bits are expanded by the screw driver bit.

Figure 11:
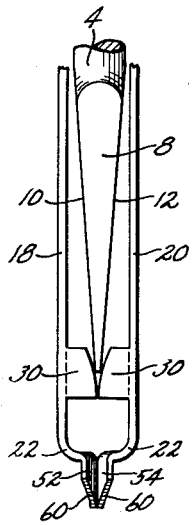
Fig. 11 is an enlarged fragmentary view similar to Fig. 1, showing a third modification of the shape of the screw holding bits, this modification being particularly adapted for use in Phillips-type screws.
Figure 12:
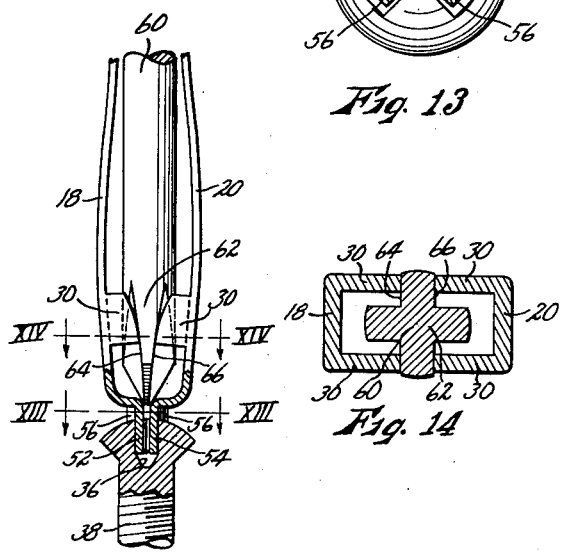
Fig. 12 is a view similar to Fig. 11, showing the screw holding attachment mounted on a Phillips-type screw driver and in engagement with a Phillips-type screw.
Figure 14:
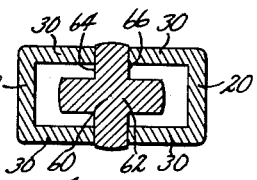
Fig. 14 is an enlarged section taken on line XIV—XIV of Fig. 12.

Fig. 11 shows the special Phillips screw adaptation of the attachment mounted on a standard screwdriver shank 4 and operable by the bit 8 thereof. Figs. 12 and 14 show the attachment mounted on and operable by a Phillips-type screw driver, and it will be apparent that any of the species shown could be so mounted. The Phillips screw driver includes a rod like shank 60 with its lower end portion notched longitudinally at its quadrant points to form a bit 62 which is cruciform in cross-section, as shown in Fig. 14. This bit may be regarded as two crossed wedge-shaped bits disposed at right angles to each other, and is specially adapted to fit the slot 36 of a Phillips screw. In the present application, the fulcrum members 30 carried by the arms 18 and 20 of the attachment engage slidably the opposite faces 64 and 66 of one of the arms of bit 62, as shown in Fig. 14. Since faces 64 and 66 are relatively inclined in a wedge shape, they serve to expand the screw holding bits 52 and 54, or the bits of any of the species, as previously described. The spaced apart relationship of the fulcrum members 30 associated with each of arms 18 and 20 permits them to bridge over the arm of the cruciform bit 62 which is not in actual use.

While the wedge-shaped arms of the Phillips screw driver bit 62 function in connection with the screw holder attachment in most respects identically as does the bit 8 of the standard screw driver, it should be noted that the wedge faces 64 and 66 of a Phillips screw driver bit are commonly not planar, but are arcuately dished. For this reason, partially, the wedge contacting inner ends of fulcrum members 30 are also formed arcuately, thereby insuring that they will slide freely on any portion of surfaces 64 and 66. This arcuate formation of the fulcrum members also provides that they will ride smoothly on the wedge surfaces of either type of screw driver despite the rocking movement of said fulcrum members caused by the flexing movements of arms 18 and 20 during operation of the device.

Thus it is apparent that a screw holding device having several advantages has been produced. It is extremely simple and economical in structure, being formed of a single piece of spring steel stock. It is mountable on and operable by screw drivers of both the standard and the "Phillips" types, and does not interfere with the ordinary functions of the screw drivers. It will function efficiently to hold screws having the standard screw driver slot or the cruciform "Phillips" slot, even though the slots vary substantially in width, or are worn or battered. Within limitations inherent in the "split-bit" type of screw holder, it is quite sturdy and capable of delivering substantial torque. The screw holding bits are protected from damage due to overloading.

Although we have shown and described certain specific embodiments of our invention, it is apparent that many minor changes of structure and operation could be made without departing from the spirit of the invention as defined by the scope of the appended claims.

What we claim as new and desire to protect by Letters Patent is:

1. A screw holding attachment for a screw driver having a rod-like shank and a wedge-shaped bit at the end of said shank, said attachment comprising a member adapted to be mounted on said shank for frictional sliding movement therealong, a pair of resilient arms connected at one end to said sliding member and extending longitudinally of said shank on diametrically opposite sides thereof, the free end portion of each of said arms being formed to present a longitudinally extending bit, said bits being adapted by the movement of said sliding member on said shank to be retracted behind or extended forwardly from the end of said screw driver bit, said bits when extended being normally disposed in close juxtaposition so as to be insertable simultaneously in the screw driver slot of a screw, and a fulcrum member carried by each of said arms adjacent the free end thereof, said fulcrum members extending inwardly from said arms to bear slidably at all times against the respective wedge faces of said screw driver bit, whereby as said screw driver bit is advanced between said fulcrum members, said bits on said arms will be moved transversely in opposite directions to engage the side walls of said screw slot, the fulcrum member associated with each of the resilient arms comprising a pair of ears integral with said arm and disposed respectively at the extreme opposite lateral edges of said arm whereby to impart a maximum rotational torque to said arm and whereby to provide a lateral spacing between said ears.

2. The structure as recited in claim 1 wherein the free end portions of the bits carried by the arms are tapered for insertion in screw slots having inclined walls.

3. The structure as recited in claim 1 wherein the bits carried by the arms are formed of flat stock of equal and coextensive width, the inner faces of said bits normally being urged together by the resilience of said arms, and the outer surface of each of said bits being outwardly inclined in the direction of expanding movement of said bit.

4. The structure as recited in claim 1 wherein the bit carried by each of said arms is angular in cross-section, the edge portions thereof being disposed substantially at right angles to each other and inclined equally with respect to a central plane passing between said bits.

References Cited in the file of this patent

UNITED STATES PATENTS

| | | |
|---|---|---|
| 925,115 | Loewenberg | June 15, 1909 |
| 1,178,141 | Eckman | Apr. 4, 1916 |
| 1,392,796 | Reinhalter | Oct. 4, 1921 |
| 1,394,438 | Mills | Oct. 18, 1921 |
| 1,742,278 | Reid | Jan. 7, 1930 |
| 1,945,829 | Sofield | Feb. 6, 1934 |
| 2,313,710 | Gemmell | Mar. 9, 1943 |
| 2,625,971 | Bier | Jan. 20, 1953 |